(12) United States Patent
Lee

(10) Patent No.: US 6,642,511 B1
(45) Date of Patent: Nov. 4, 2003

(54) MOUNTING APPARATUS FOR OPTICAL SENSOR HAVING SCREW PILES WITH ANNULAR FITTING BOARDS

(75) Inventor: An-Lun Lee, Kaohsiung (TW)

(73) Assignee: Max Data Systems, Inc., Hsinchu (TW)

( * ) Notice: Subject to any disclaimer, the term of this patent is extended or adjusted under 35 U.S.C. 154(b) by 0 days.

(21) Appl. No.: 10/064,138

(22) Filed: Jun. 13, 2002

(51) Int. Cl.[7] .................................................. H01J 5/02
(52) U.S. Cl. ......................................... 250/239; 250/235
(58) Field of Search ............................... 250/239, 234, 250/235, 551, 216; 257/80–85, 431–435; 358/482–484

(56) References Cited

U.S. PATENT DOCUMENTS 5,111,041 A * 5/1992 Imai ............................ 250/239

* cited by examiner

Primary Examiner—Que T. Le
(74) Attorney, Agent, or Firm—Jiang Chyun IP Office

(57) ABSTRACT

A mounting apparatus for an optical sensor, applied to an optical scan module. A screw pile with a filet slot head, a washer and a screw nut are used to mount the base plate of the charged-couple device to the main body. Therefore, it is easy to adjust the skew in the direction parallel to the base plate of the charged-couple device and the depth of focus.

10 Claims, 6 Drawing Sheets

MOUNTING APPARATUS FOR OPTICAL SENSOR HAVING SCREW PILES WITH ANNULAR FITTING BOARDS

BACKGROUND OF THE INVENTION

1. Field of the Invention

The invention relates in general to a method of fabricating a semiconductor device, and more particular, to a method of fabricating a memory device.

2. Description of Related Art

As image input, process and finishing have evoked public interest, the scanner is now the basic equipment for many computer users. The scanner is used to scan the text or graphic information of a document, a magazine, a book or a picture. The scanned information is then input to the computer for further process. Of the various kinds of scanners, the flatbed scanner is very common. The scan module of the flatbed scanner is installed under a transparent platform to scan the document disposed on the transparent platform by iterative movement. As the scan module itself does not have power, a driving mechanism such as a step motor, a gear and a belt is required. While scanning a document by the flatbed scanner, the document disposed on the transparent platform has to be covered with a cover lid, such that the document is appressed on the transparent platform for scan.

The conventional optical scan module (referring to FIG. 1) comprises a light source 100, a reflecting mirror set 400, an optical lens 500, an optical sensor 600 (such as a charged-couple device, CCD), and a main body 700. The light source 100, the reflecting mirror set 400, the optical lens 500 and the optical sensor 600 are located in the main body 700. The light source 100 radiates the document on the transparent platform 300 that is reflected to transmit an image light. The reflecting mirror set 400 includes multiple reflecting mirrors 401, 402 and 403 along the optical path of the image light, such that the image of the document 200 is directed into the reflecting mirror set 400. Being reflected from the reflecting mirror set 400, the image light is transmitted to the optical lens 500. Upon the reception, the optical lens 500 displays the image light of the document transmitted from the reflecting mirror set 400 to the charged-couple device 600.

As shown in FIG. 2, the mounting apparatus for the optical lens 500 is installed in the main body 700 and is integrally formed therewith. The mounting apparatus has a near trapezoid seat, of which a front end has a hollow lens thimble 800 for mounting the optical lens 500. That is, the optical lens 500 is telescopically received within the lens thimble 800. After adjusting the focal length, glue dispense or a screw is used to reinforce the fixture. The charged-couple device 600 is mounted at the rear side of the trapezoid seat of the mounting apparatus to receive the image light transmitted from the optical lens 500.

To comply with the trends of being light, thin, short and small, the scanner is formed with a shrinking and delicate dimension. The optical cone of the image light projected from the optical lens 500 to the charged-couple device 600 becomes smaller and smaller. As a result, the depth of focus becomes shallower and shallower. An accurate adjustment of the relative positions for the optical lens 500 and the charged-couple device becomes crucial for the correct depth of focus.

After the skew in the direction parallel to the base plate is adjusted, the base plate of the conventional charged-couple device 600 is directly locked to the main body (at the rear side of the trapezoid seat of the mounting apparatus of the optical lens) with a screw, so that the distance to the optical lens 500 cannot be further adjusted. Thus, the adjustment of the depth of focus between the optical lens 500 and the charged-couple device 600 can only be made at the optical lens 500. To allow the charged-couple device 600 to adjust the position (that is, the distance to the optical lens 500) to match the correct depth of focus, the previously adjusted skew is inevitably changed. Therefore, three degrees of freedom have to be considered causing great difficulty in adjustment of the charged-couple device.

SUMMARY OF INVENTION

The present invention provides a mounting apparatus for an optical sensor. A screw pile with one end having a filet slot, a washer and a screw nut are used to mount the base plate of the charged-couple device to the main body, so that the skew in the direction parallel to the base plate and the depth of focus of the charged-couple device can be adjusted independently.

The mounting apparatus of the optical sensor is applied to an optical scanner module. The optical scanner module has a main body and an optical sensor. The optical sensor further comprises a base plate with a plurality of through holes. A plurality of screw piles and screw nuts are used as the mounting apparatus.

Each of the screw piles has a nut side and a bolting side. An annular fitting board is inserted between the nut side and the bolting side. The nut side of each screw pile is threaded through one through hold of the base plate, while the bolting side thereof is latched to the main body. One side of the screw pile at the nut side has a filet slot, such that a filet screw driver can be used to turn the screw pile and to adjust the position along the axis thereof.

A plurality of screw nuts are used to lock the nut sides of the screw piles, such that the base plate is restrained to each screw pile between the annular fitting board and the corresponding screw nut thereof.

The present invention further includes a plurality of washers inserted between each screw nut and the base plate to reinforce the mounting strength.

The main body further comprises a plurality of slot openings, each of which has a threaded hole allowing the bolting side of each screw pile to be locked therein. The annular fitting board is disposed in the slot opening, while the depth of the slot opening is larger than the thickness of the annular fitting board. The annular fitting board can thus be embedded in the slot opening, and the base plate can be appressed to the main body.

After adjusting the base plate, glue is dispensed at the connecting part between the bolting side of each screw pile and the main body to reinforce the fixture of the screw pile, so as to prevent the screw pile from becoming loose due to vibration.

BRIEF DESCRIPTION OF DRAWINGS

These, as well as other features of the present invention, will become more apparent upon reference to the drawings wherein.

DETAILED DESCRIPTION

Figure 1:
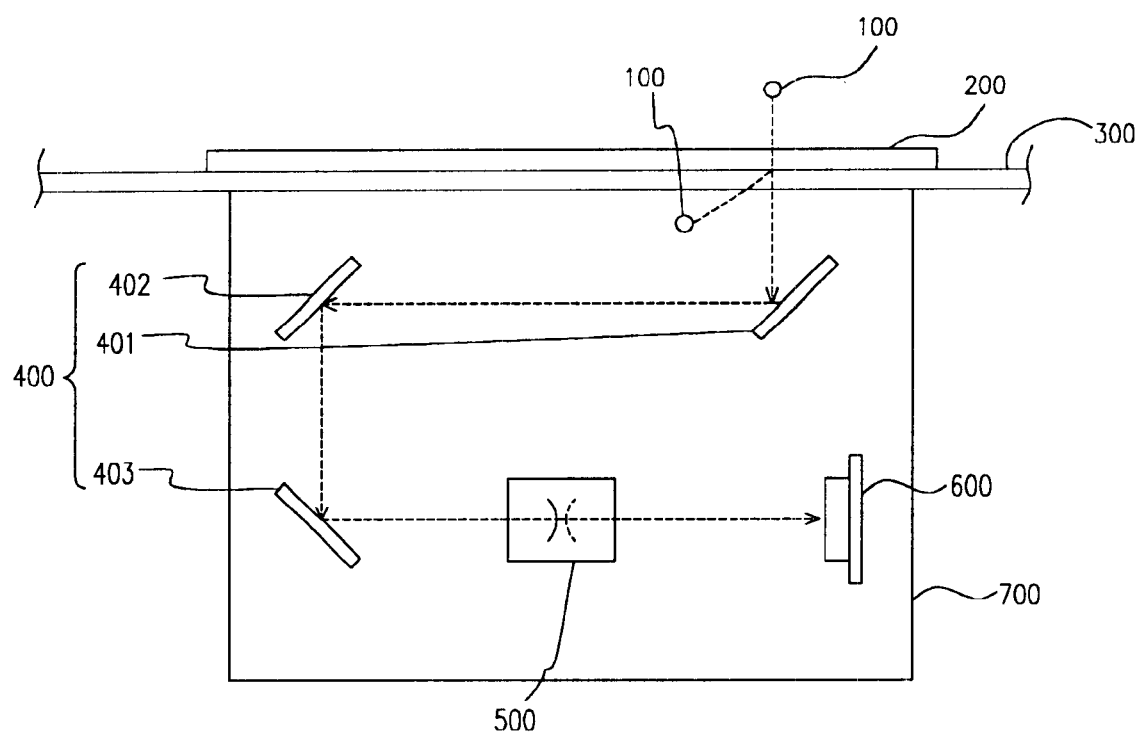
FIG. 1 schematically shows a conventional optical scan module.
Figure 2:
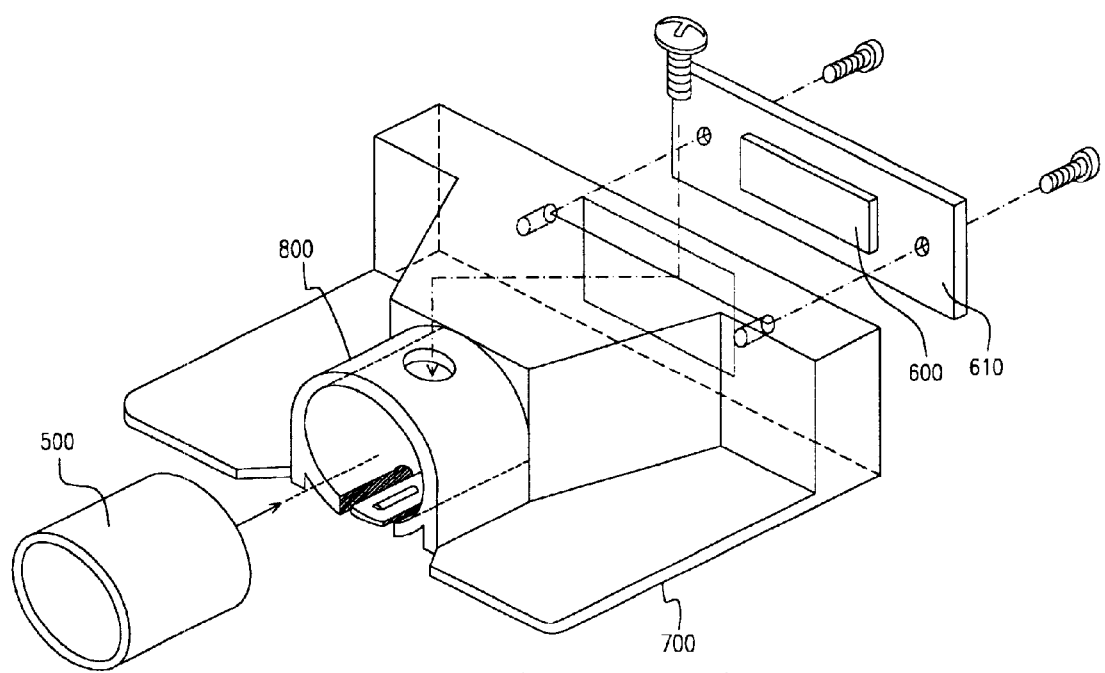
FIG. 2 shows an elevated view of a charged-couple device mounted on the main body.
Figure 3:
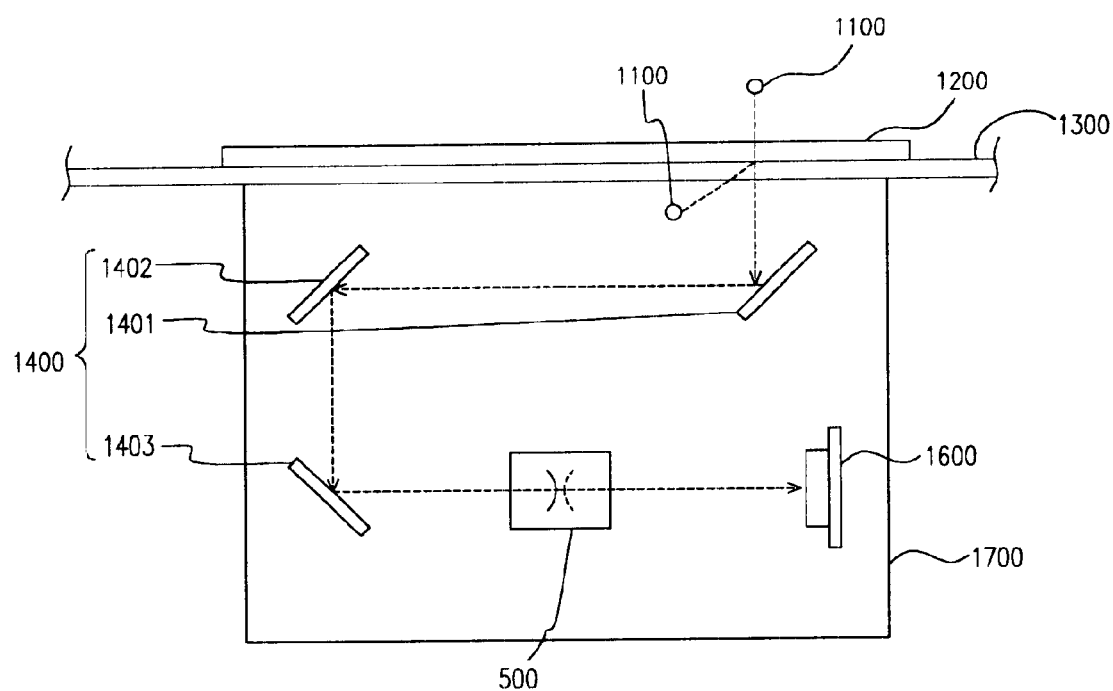
FIG. 3 shows a schematic drawing of an optical scan module according to the present invention.

Referring to FIG. 3, a plane view of an optical scan module according to one embodiment of the present invention is shown. The optical scan module comprises a light source 1100, a reflecting mirror set 1400, an optical lens 1500, a main body 1700 and an optical sensor such as charged-couple device (CCD) 1600. The light source 1100, the reflecting mirror set 1400, the optical lens 1500, and the optical sensor 1600 are located in the main body 1700. During scanning operation, the light source 1100 radiates on the document 1200 disposed on a transparent platform 1300. By reflection or transmission, an image light is obtained. The reflecting mirror set 1400 has multiple reflecting mirrors 1401, 1402, 1403 located along an optical path of the image light, so that the image of the document 1200 can be directed to the reflecting mirror set 1400. Being reflected from the reflecting mirror set 1400, the image light is then transmitted to the optical lens 1500. The optical lens 1500 then displays the image light of the document 1200 to the charged-coupled device 1600.

Figure 4:
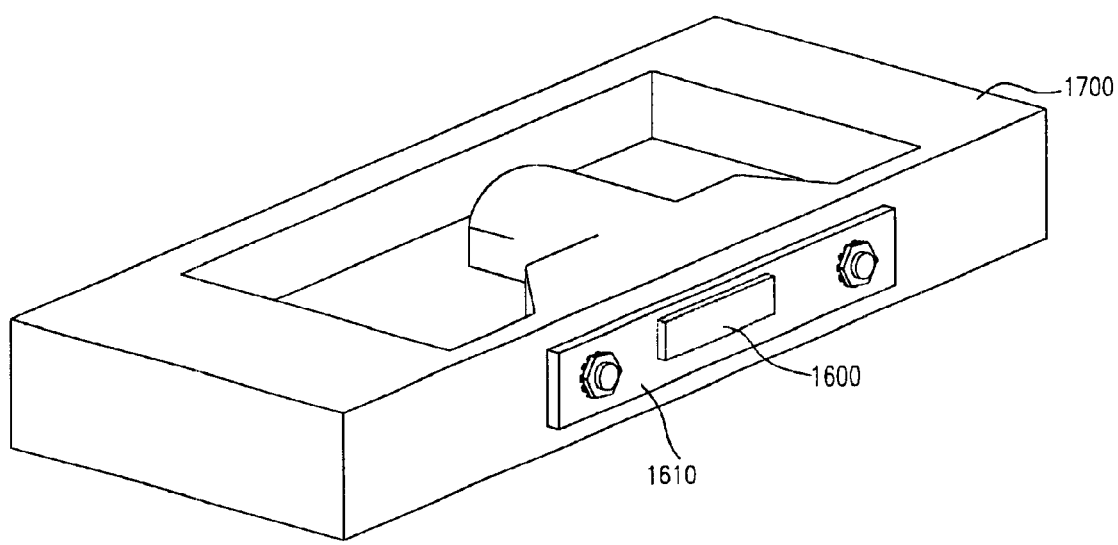
FIG. 4 shows the elevated view of a mounting apparatus of an optical sensor according to the present invention.

As shown in FIG. 4, the charged-couple device 1600 is mounted on the main body 1700 (at the rear side of the trapezoid seat of a mounting apparatus of the optical lens 1500) to receive the image light of the document 1200 transmitted from the optical lens 1500.

Figure 5:
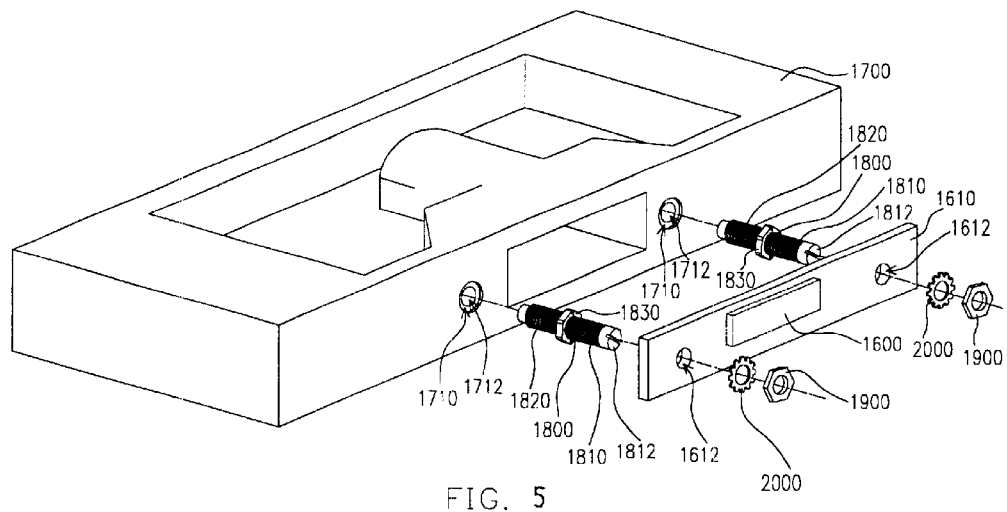
FIG. 5 shows an exploded view of the mounting apparatus of the optical sensor according to the present invention.
Figure 6:
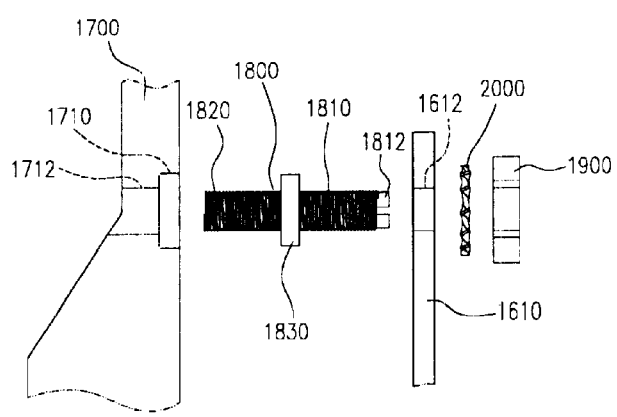
FIG. 6 shows an exploded side view of the mounting apparatus of the optical sensor.
Figure 7:
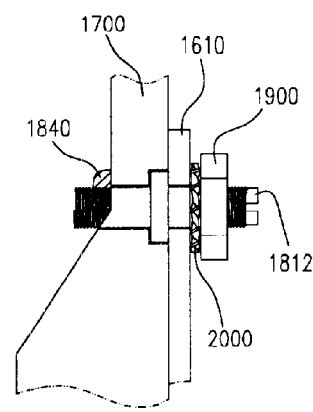
FIG. 7 shows the side view of the assembly of the mounting apparatus of the optical sensor.

Referring to FIG. 5, an exploded view of the mounting apparatus of the optical sensor includes multiple (two in this embodiment) screw piles 1800 and multiple (two in this embodiment) nuts 1900. The screw pile 1800 is boltless with an annular fitting board 1830 at each of the nut side 1812 and the bolting side. The relative positions of a screw pile 1800 and a screw nut 1900 are shown in FIGS. 6 and 7, where FIG. 6 is an exploded side view, while FIG. 7 is a side view for the assembly.

The nut side 1810 of each screw pile 1800 is perforated into a through hole 1612 of a base plate of the charged-couple device 1600 and the screw nut 1900 is threaded in at the nut side 1810, so that the base plate 1610 of the charged-couple device 1600 is bound between the annular fitting board 1830 and the screw nut 1900. Therefore, the skew of the base plate 1610 of the charged-couple device 1600 can be further adjusted.

The bolting side 1820 is semi-permanently latched to the main body 1700 at the threaded bore 1712 of the slot opening. The above annular fitting board 1830 is embedded into the slot opening 1710 with a thickness smaller than the depth of the slot opening 1710, such that the base plate 1610 of the charged-coupled device 1600 can be flatly appressed on the main body 1700.

The end of the nut side 1810 has a filet slot head 1812, such that a filet screw driver (not shown) can be used to turn the filet slot head 1812, so as the adjust the screw pile 1800 along the axis. When the screw pile 1800 moves back and forth along the axis thereof, the base plate 1610 of the charged-couple device 1600 is still restrained between the annular fitting board 1830 and the screw nut 1900 without affecting the adjusted skew. Therefore, the distance between the charged-couple device 1600 and the optical lens 1500 can be adjusted to control the accurate depth of focus.

The screw pile 1800 and the screw nut 1900 of the mounting apparatus of the optical sensor provided by the invention allows the charged-couple device 1600 to adjust the skew and the accurate depth of focus independently with a simple mechanism.

Further, a washer 2000 can be further disposed between the screw nut 1900 and the base plate 1610 of the charged-couple device 1600 to provide the improved locking status of the base plate 1610 of the charged-couple device 1600.

After adjusting the skew of the base plate 1610 and the depth of focus of the charged-couple device 1600, glue 1840 is dispensed at the connecting part between the bolting side 1820 of each screw pile 1800 and the main body 1700 as shown in FIG. 7. The screw pile 1800 can thus be fixed to the main body 1700 without being loose due to vibration to affect the adjusted position of the base plate 1610 of the charged-couple device 1600 in three degrees of freedom.

Accordingly, mounting apparatus of the optical sensor provided by the present invention uses the simple mechanism of a screw pile with a filet-slot head at one side and the above annular fitting board to allow independent adjustment of the skew and the depth of focus for the charged-couple device.

The advantage of the present invention comprises using the simple mechanical design of a screw pile with one filet-slot head at one side and the above annular fitting board to allow independent adjustment of skew and depth of focus of the charged-couple device. The objective of correctly adjusting the depth of focus of the charged-couple device can be easily achieved.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A mounting apparatus for an optical sensor, applied to an optical scanner module which comprises a main body and an optical sensor, and the optical sensor having a base plate with a plurality of through holes, the mounting apparatus comprising:

a plurality of screw piles, each of which includes a nut side and a bolting side, wherein an annular fitting board is inserted between each pair of the nut sides and the bolting sides; and a plurality of screw nuts, each of which is screwed with one of the screw piles at the nut side thereof, such that the base plate is restrained to the screw piles between the annular fitting boards and the screw nuts.

2. The mounting apparatus according to claim 1, wherein each bolting side is fixed to the main body, and each nut side has a filet slot thereon.

3. The mounting apparatus according to claim 1, further comprising a plurality of washers inserted to the screw piles at the nut sides between the screw nuts and the base plate.

4. The mounting apparatus according to claim 1, wherein the main body further comprises a plurality of slot openings, each of which further includes a threaded hole therein, so that each bolting side is locked in one of the threaded holes, and the annular fitting boards are positioned in the slot openings, while a depth of the slot opening is larger than a thickness of the annular fitting board.

5. The mounting apparatus according to claim 1, wherein glue is dispensed at a connecting part between the bolting side of each screw pile and the main body to allow the screw piles fixed to the main body.

6. An optical scanner module, used scan a document, comprising:

a main body;

a light source, disposed in the main body to radiate the document, so as to obtain an image light;

a reflecting mirror set, installed in the main body along an optical path of the image light;

an optical lens, located along the optical path after the reflecting mirror set;

an optical sensor, mounted in the main body and located along the optical path after the optical lens, the optical sensor having a base plate with a plurality of through holes;

a plurality of screw piles, each of which has a nut side, a bolting side, and an annular fitting board therebetween, wherein each nut side is threaded into one of the through holes; and a plurality of screw nuts, screwed with the screw piles at the nut sides, so that the base plate is restrained between the annular fitting boards and the screw nuts.

7. The optical scan module according to claim 6, wherein each of the bolting sides is locked to the main body, and each nut has a filet slot thereon.

8. The optical scan module according to claim 6, further comprising a plurality of washers inserted to the screw piles at the nut sides between the screw nuts and the base plate.

9. The optical scan module according to claim 6, wherein the main body further comprises a plurality of slot openings, each of which further includes threaded holes therein, so that each bolting side is locked in one of the threaded holes, and the annular fitting boards are positioned in the slot openings, while a depth of the slot opening is larger than a thickness of the annular fitting board.

10. The optical scan module according to claim 6, wherein glue is dispensed at a connecting part between the bolting side of each screw pile and the main body to allow the screw piles to be fixed to the main body.

* * * * *